United States Patent
Nagaike et al.

(10) Patent No.: US 6,783,230 B2
(45) Date of Patent: Aug. 31, 2004

(54) INK JET RECORDING MEDIUM

(75) Inventors: Chiaki Nagaike, Asaka (JP); Eiichi Ueda, Akishima (JP); Yuji Hosoi, Hochioji (JP); Akihisa Nakajima, Sagamihara (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 10/441,813

(22) Filed: May 20, 2003

(65) Prior Publication Data

US 2003/0231237 A1 Dec. 18, 2003

(30) Foreign Application Priority Data

May 28, 2002 (JP) ........................................ 2002-153901
Jun. 11, 2002 (JP) ........................................ 2002-169797

(51) Int. Cl.$^7$ ................................................ B41J 2/01
(52) U.S. Cl. ........................ 347/105; 428/32.1; 430/207
(58) Field of Search ................................. 347/105, 101, 347/100, 96; 428/32.1, 195; 430/207

(56) References Cited

U.S. PATENT DOCUMENTS

| 4,579,781 A | * | 4/1986 | Akao ........................... 428/461 |
| 5,039,378 A | * | 8/1991 | Pommier et al. ............ 428/323 |
| 5,514,636 A | * | 5/1996 | Takeuchi ..................... 503/207 |
| 6,342,331 B2 | * | 1/2002 | Oi ................................ 430/207 |
| 6,550,909 B2 | * | 4/2003 | Ichinose et al. ............. 347/105 |

* cited by examiner

Primary Examiner—Stephen D. Meier
Assistant Examiner—Manish Shah
(74) Attorney, Agent, or Firm—Muserlian, Lucas and Mercanti

(57) ABSTRACT

An ink-jet recording medium including a support having thereon an ink receptive layer, wherein the support includes a white-colored substrate and a blue-colored substrate laminated with each other.

19 Claims, No Drawings

INK JET RECORDING MEDIUM

TECHNICAL FIELD

The present invention relates to an ink jet recording medium which comprises a support having thereon an ink receptive layer, a recorded image, and a method for viewing an image recorded on the aforesaid medium, and in more detail to an ink jet recording medium which comprises a support exhibiting optical characteristics having thereon an ink receptive layer, a recorded image, and a method for viewing an image recorded on the aforesaid medium. The present invention relates specifically to an ink jet recording medium for forming medical images which is suitable for displaying images of the interior of a human body which are obtained by medial diagnosis and a method for viewing the image recorded on the aforesaid medium.

BACKGROUND

Heretofore, examination methods for imaging the interior of human body have included ultrasonography, medical thermography, magnetic resonance imaging, positron emission tomography (PET), and a method employing radiation, such as X-rays. The resulting image information is recorded on a silver halide photographic film which comprises a blue tinted transparent support having thereon a recording layer. Subsequently, the resulting film is placed on a so-called viewing box in which a light source is provided which emits white light and is viewed utilizing transmitted light. Accordingly, image viewing locations are limited, because the aforesaid viewing box is required.

A method which avoids the location restriction includes a method in which images are viewed employing reflected light. In such cases, images are formed on a white reflection recording medium such as paper and are then viewed. As a result, viewing locations are not particularly limited as long as the viewing location is bright.

However, in regard to images which have been subjected to diagnosis employing conventional silver halide light-sensitive photographic materials, images formed on reflection media results in a sense of incongruity. Further, for strict diagnosis and judgment, viewing methods analogous to the conventional method are preferred after all.

Accordingly, the following image recording medium is sought. Diagnosis is carried out utilizing transmitted light in the same manner as before. Thereafter, if desired, it is possible to view images at a requested place such as a hospital room for explanation to a patient, without employing a viewing box which requires a large room.

Further, image output is carried out as follows: Information and image digital information, which have been recorded directly on silver halide film via a screen film, are recorded on a silver halide film, using a laser imager and is then subjected to wet system development or dry system development employing heat. Such a system, employing silver halide film, has been widely used due to high reliability as well as formation of excellent image quality.

However, the aforesaid laser imager is relatively expensive, and the development apparatus is relatively large. Occasionally, image quality analogous to the silver halide film is not needed. Therefore, less expensive and smaller imagers are needed.

Employed as image forming methods applied to a downsized apparatus may be a wire dot output system, a thermosensitive color forming output system, a thermosensitive fusion transfer output system, a thermosensitive sublimation transfer output system, an electrophotographic output system, and an ink jet output system which are applied to various office uses. Of these, in the ink jet output system, images as well as text are recorded in such a manner that minute ink droplets are projected employing various operation principles so as to adhere onto recording materials, such as paper. The aforesaid ink jet output system exhibits features such as a relatively small size and low price. Commonly employed as ink jet recording materials are those which are prepared by applying an ink receptive layer as a recording layer onto various supports. The aforesaid ink receptive layer is divided mainly into a so-called swelling type ink receptive layer comprised mainly of hydrophilic binders, and a void type ink receptive layer which has a void layer in the recording layer. Among these, ink jet recording media, having the void type ink receptive layer, comprise a support having thereon, as an ink receptive layer, the void layer in which voids are formed by allowing fine particles to be incorporated in the hydrophilic binders. These aforesaid ink jet recording media have advantages such as high ink absorbability, less tendency of image beading in the region of large ink amounts, and less degradation of image quality in high density regions.

In recent years, a number of investigations have been performed seeking high quality images which employ ink jet recording. One of these investigations makes it possible to enhance transparency by employing fine particles having a smaller diameter and lower refractive index as fine particles employed to form the void type ink absorbing layer. In addition, by doing so, it has been found that it is possible to efficiently form voids, to achieve relatively high glossiness and to produce in higher density images.

Further, in order to enhance water resistance as well as moisture resistance of dyes, heretofore, proposed have been various methods in which dyes are fixed with binders. A particularly effective means is addition of polymers having tertiary or quaternary nitrogen atoms. A great many methods are proposed in patent publications including for example, Japanese Patent Application Open to Public Inspection Nos. 57-36692, 53-49113, 58-24492, 63-224988, 63-307979, 59-198186, 59-198188, 60-46288, 61-61887, 61-72581, 61-252189, 62-174184, 63-162275, and 6-153798. Through such technical progress, in recent years, the kinds of medical images have increased which can be formed employing ink jet printing and can be employed for diagnosis. In addition, a certain kind of image is recorded on recording materials such as paper and viewed utilizing reflected light.

However, there have been no ink jet recording media which make it possible to view images recorded by the ink jet system utilizing either transmitted light or reflected light and to use the aforesaid images for practical diagnosis.

SUMMARY OF THE INVENTION

Accordingly, an aspect of the present invention is to provide an ink jet recording medium which makes it possible to view images recorded by an ink jet recording system utilizing either transmitted light or reflected light and to use the aforesaid images for practical diagnosis, and a viewing method using the same.

The above-described aspect of the invention can be achieved following structure.

One structure of the invention is an ink-jet recording medium comprising a support having thereon an ink receptive layer, wherein the support comprises a white-colored substrate and a blue-colored substrate laminated with each other.

DETAILED DESCRIPTION OF THE INVENTION

The present invention will now be detailed. The present invention relates to an ink jet recording medium for medical diagnosis, which makes it possible to view images recorded on the aforesaid medium, utilizing either reflected light or transmitted light or to use the aforesaid images for medical diagnosis.

Supports, as described in the present invention, refer to sheet materials which are finalized as an ink jet recording medium when an ink receptive layer is applied onto the aforesaid sheet material. The aforesaid support may be comprised of a single sheet material or may be provided with various functional layers other than the aforesaid ink receptive layer.

In the present invention, preferably employed as white substrates employed in the aforesaid supports are papers such as laminated paper, coated paper, recycled paper and synthetic paper. Of these, synthetic paper is particularly preferred. Employed as synthetic paper may be various synthetic papers known in the art such as plastic paper filled with white pigments, foamed plastic paper, and plastic paper comprising a foamed plastic paper sheet having thereon a layer filled with white pigments. Preferably employed as components of the aforesaid synthetic paper are polyesters, polyethylenes, and polypropylenes. Of these, PET film is preferred. Employed as white pigments are, for example, white inorganic pigments such as precipitated calcium carbonate, heavy calcium carbonate, magnesium carbonate, kaolin, clay, talc, mica, calcium sulfate, barium sulfate, titanium dioxide, zinc oxide, zinc sulfide, satin white, aluminum silicate, diatomaceous earth, calcium silicate, magnesium silicate, synthetic non-crystalline silica, colloidal silica, alumina, colloidal alumina, pseudo-boehmite, aluminum hydroxide, lithopone, zeolite, hydrated halloysite, magnesium hydroxide, potassium titanate, smectite, monmtmorillonite, and hydrotalsite, and styrene based plastic pigments, acryl based plastic pigments, polyethylene, microcapsules, urea resins, and melanin resins. They may be employed individually or in combination. Of these, titanium dioxide and magnesium carbonate are preferably employed.

Further, whiteness of white substrates in the present invention is preferably between 50 and 100. Whiteness of white substrates in the present invention, as described herein, refers to an L* value, obtained as follows: Spectral reflectance of at least one side of a substrate is determined. Subsequently, based on JIS Z 8722 (2000) (corresponding to ISO/DIS 7724 Paints and Varnishes—Part 1: Principles, Part 2: Colour Measurement), tristimulus values are obtained, and based on CIE color system, the L* value is calculated. Whiteness of the white substrate in the present invention is more preferably between 60 and 100, and is still more preferably between 80 and 100.

Preferably employed as white synthetic papers in the present invention are polymer films comprising white pigments such as titanium oxide and magnesium carbonate.

In the present invention, preferably employed as blue substrates used as a support are blue polymer resin films. The maximum absorption wavelength of the blue substrate of the present invention is preferably 520–580 nm. Further, preferably employed as blue polymer films in the present invention are those such as polyester film comprising dyes having a maximum absorption wavelength of 520–580 nm. Examples of dyes having a maximum absorption wavelength of 520–580 nm include, but are not limited to, anthraquinone dyes, azo dyes, azomethine dyes, oxonol dyes, carbocyanine dyes, and styryl dyes.

Specific examples of these dyes are shown below, but are not limited thereto.

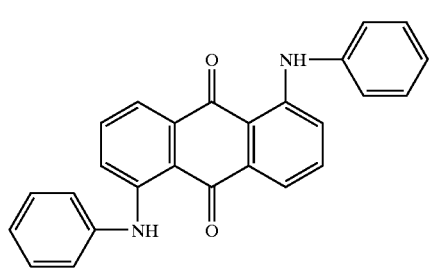

A-1

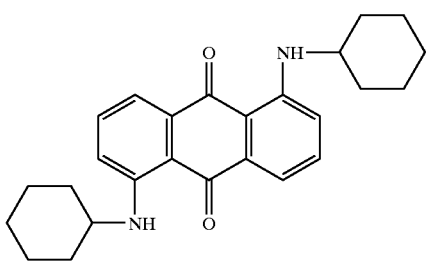

A-2

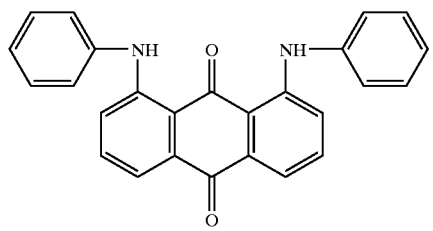

A-3

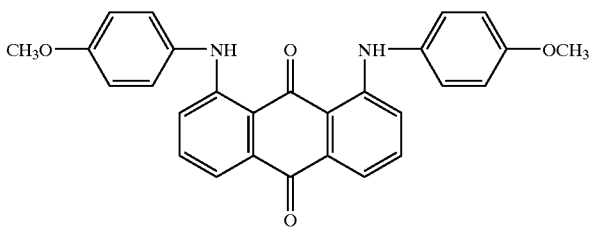

A-4

-continued
A-5
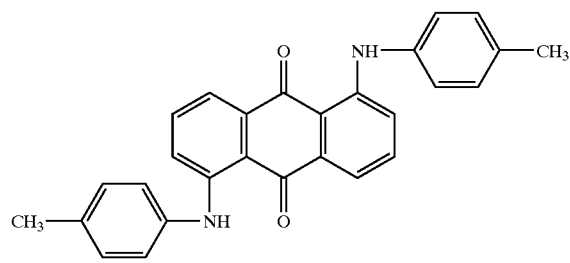
A-6
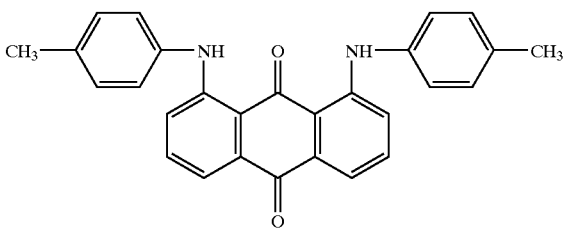
A-7
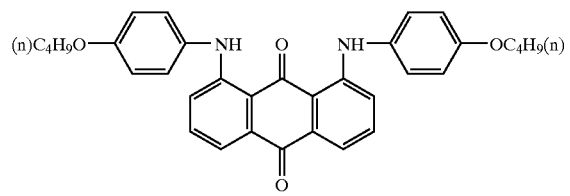
A-8
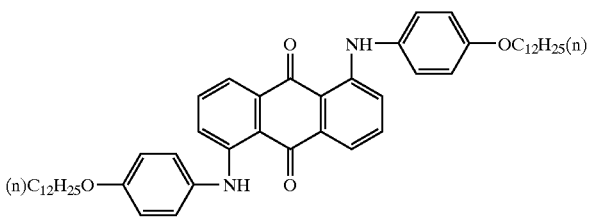
A-9
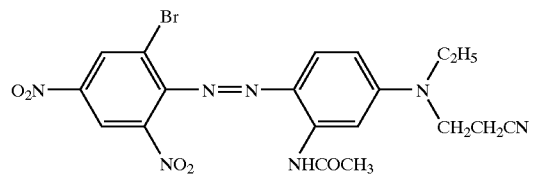
A-10
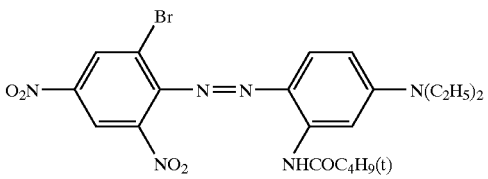
A-11
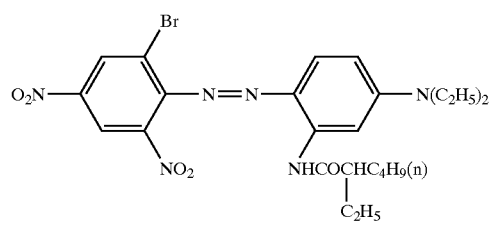
A-12
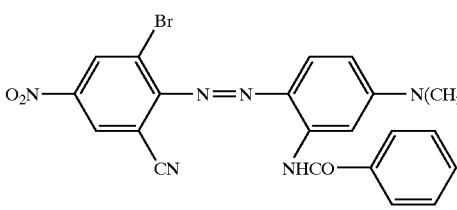
A-13
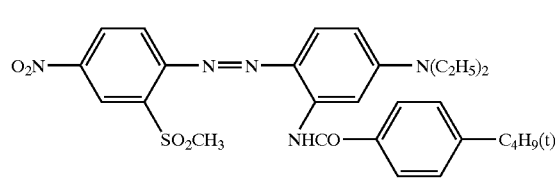
A-14
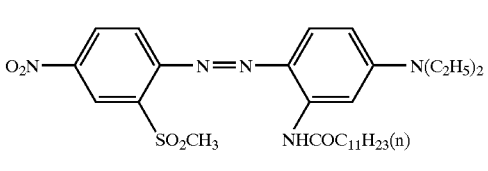
A-15
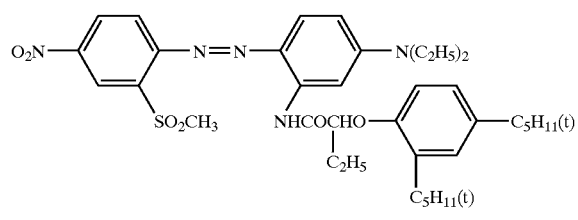
A-16
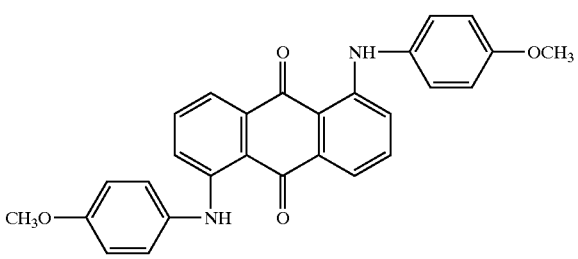
A-17
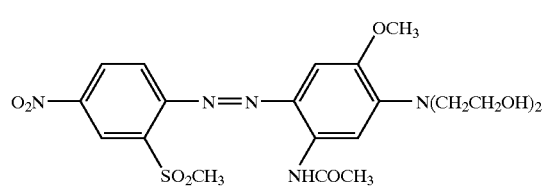
A-18
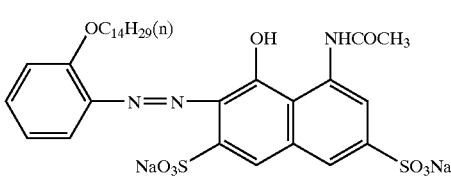

-continued
A-19
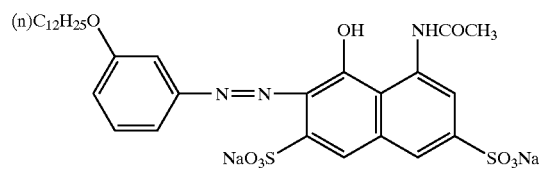
A-20
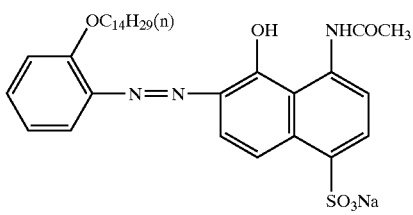
A-21
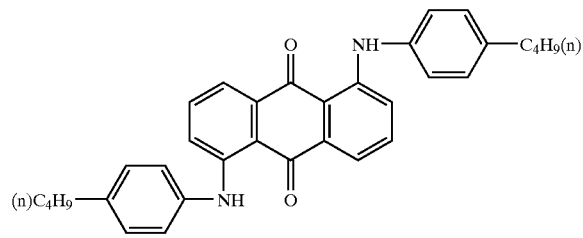
A-22
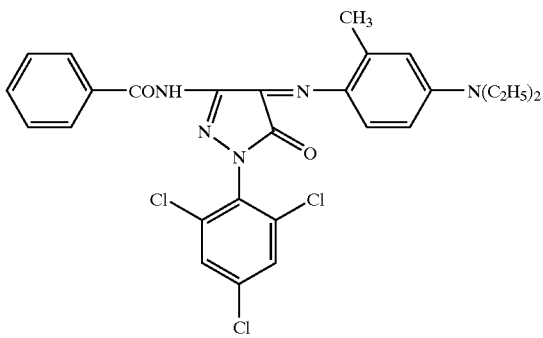
A-23
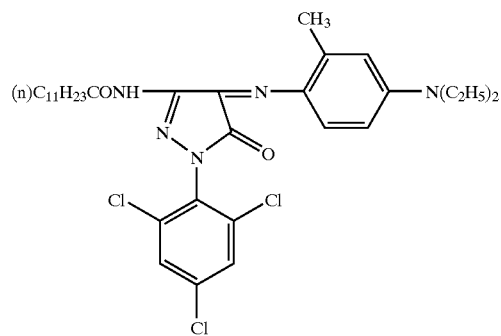
A-24
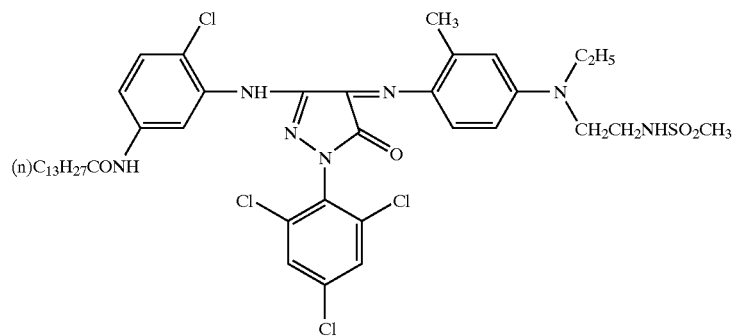
A-25
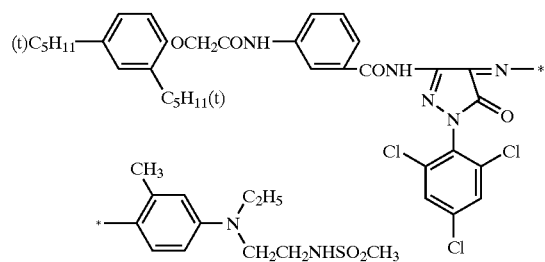
A-26
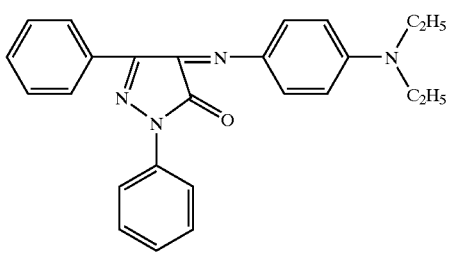

-continued
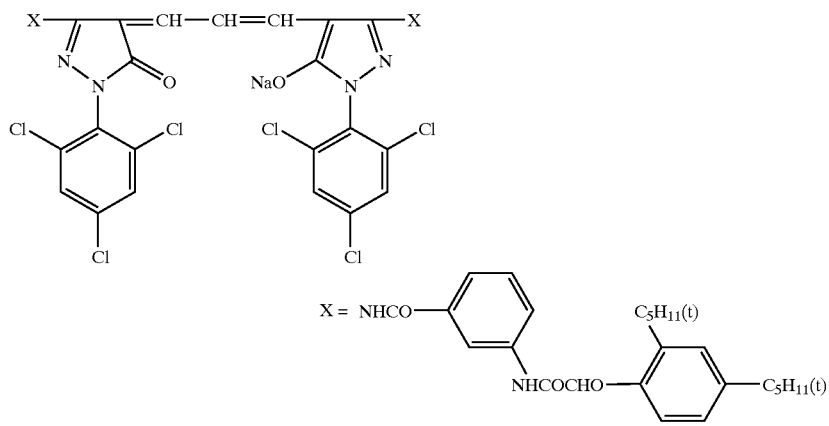
A-27
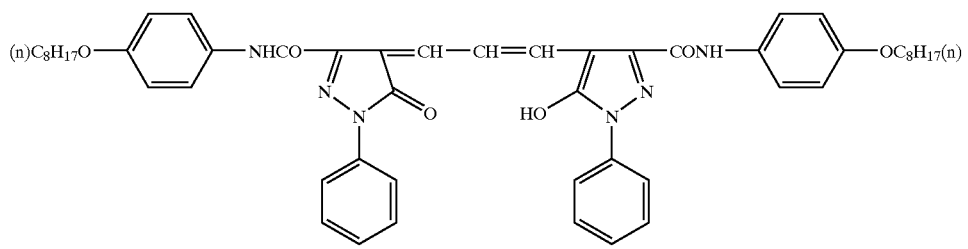
A-28
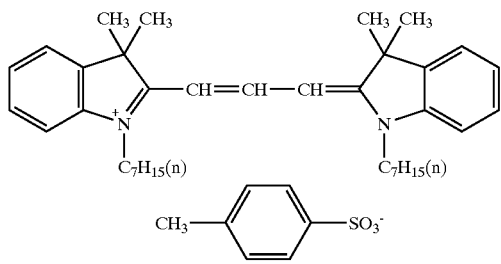
A-29
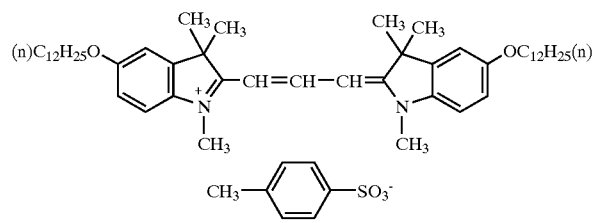
A-30
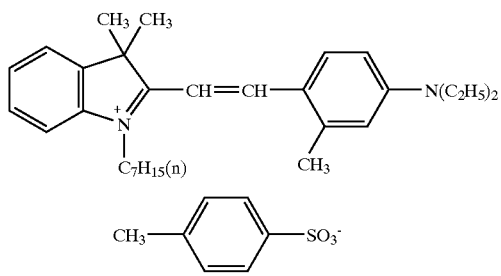
A-31
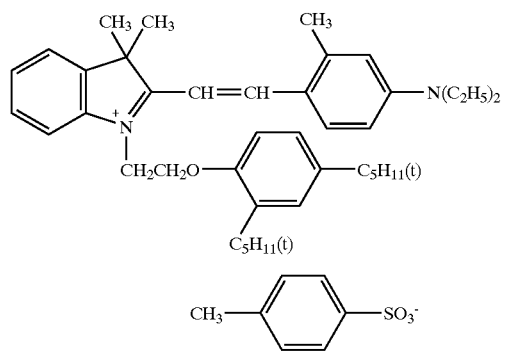
A-32

-continued
A-33
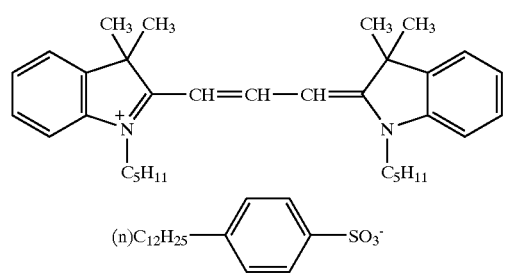
B-1
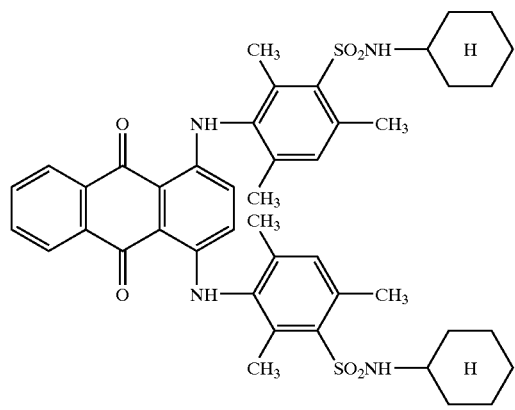
B-2
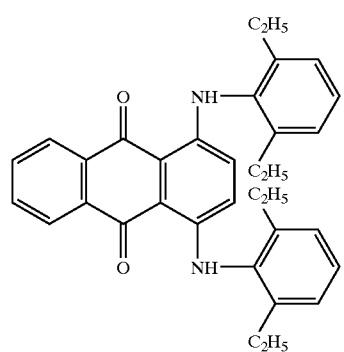
B-3
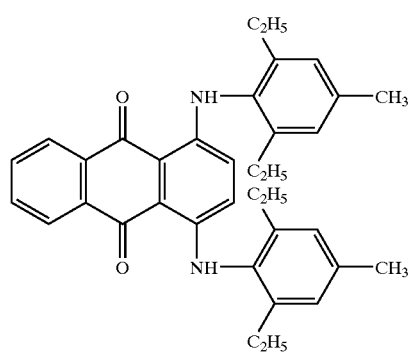
B-4
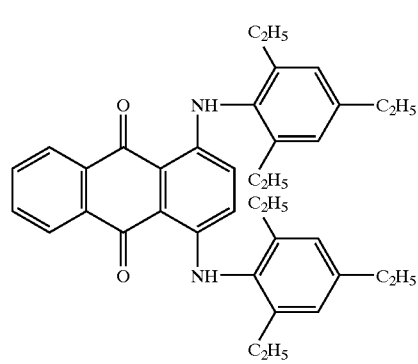
B-5
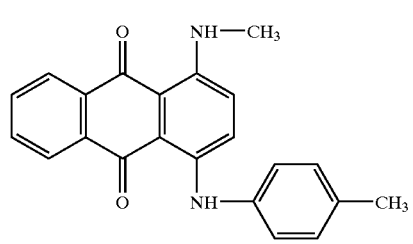
B-6
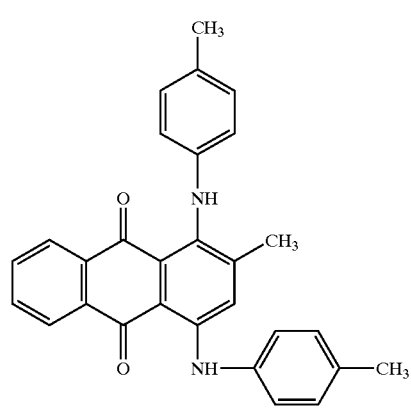
B-7
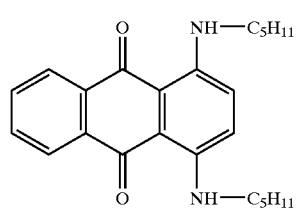

-continued
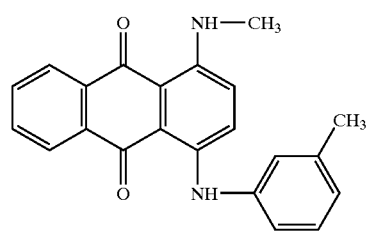
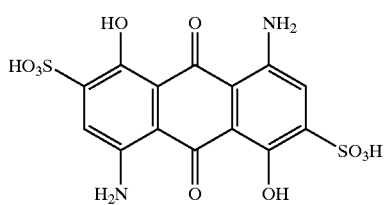
B-8 B-9
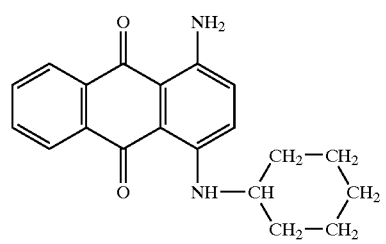
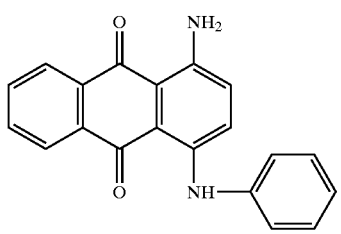
B-10 B-11
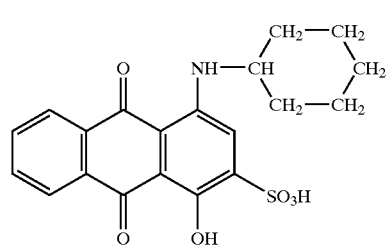
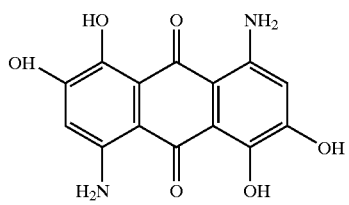
B-12 B-13
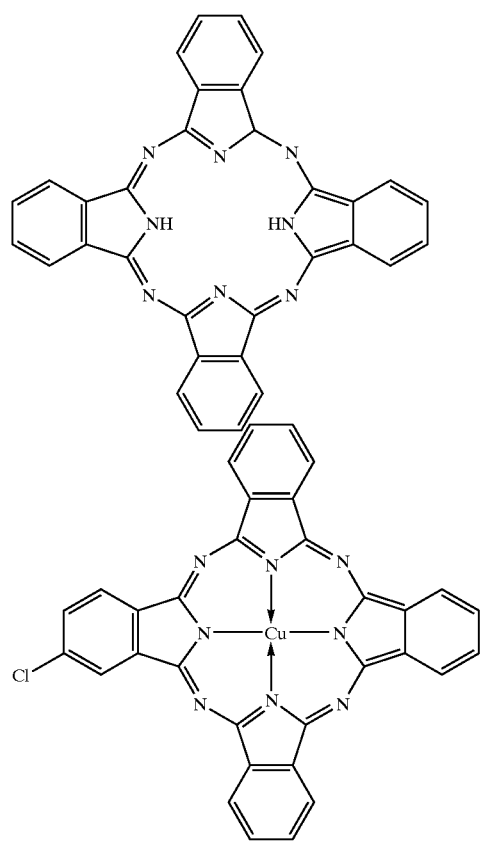
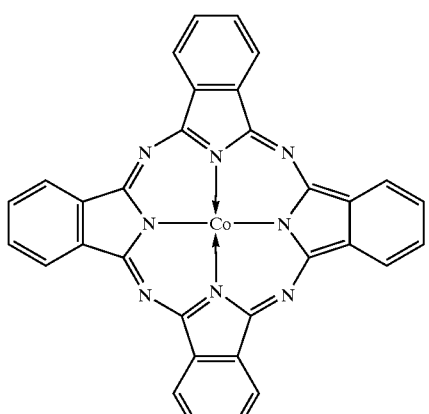
B-14 B-15
B-16 B-17
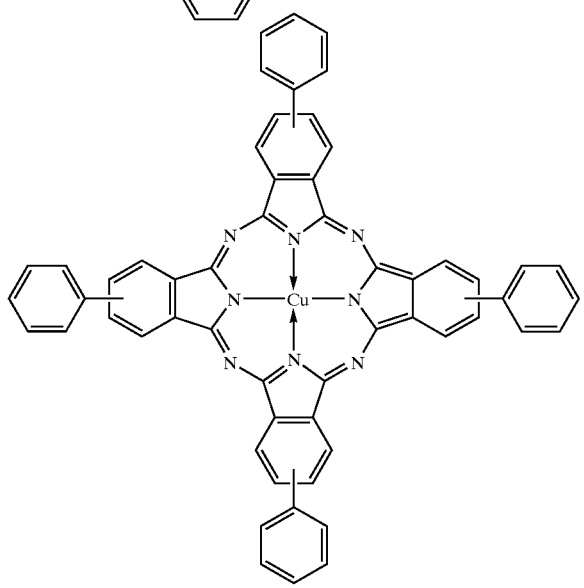

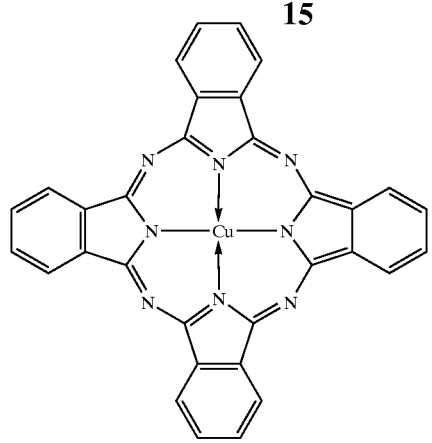

When these dyes are incorporated in polymer film, the added amount is customarily about 20–about 5,000 ppm, and is preferably from 50–500 ppm.

Employed as polymer film used as a blue substrate of the present invention may be those comprised of materials which are transparent and resistant to radiated heat used in an OHP or a backlight display. The transmittance is preferably 0.05–0.40 in terms of optical density. Preferably listed as materials may be polyesters such as polyethylene phthalate and polyethylene naphthalate, cellulose esters such as nitrocellulose, cellulose acetate, and cellulose acetate butyrate, in addition, polysulfone, polyphenylene oxide, polyimide, polycarbonate, polyamide, and syndiotactic polystyrene (SPS). Of these, polyesters are particularly preferred. The film thickness is not particularly limited but is preferably 50–200 μm for ease of handling.

The preferred constitution of the present invention is that an ink jet recording medium for medical images comprises a support, prepared by laminating a white PET film and a blue polyester film, having thereon an ink receptive layer.

The transmittance of the supports employed in the present invention is preferably between 30 and 100. Transmittance of the supports employed in the present invention, as described herein, refers to the average of spectral transmittance measured in the wavelength region of 400–700 nm. The aforesaid transmittance is more preferably between 40 and 100, and is most preferably between 50 and 100.

A medical image is written on the ink receptive layer of the image recording medium for medical images, as prepared above. When the resulting recording medium is viewed above the image receptive layer utilizing transmitted light while placing such a light source that employed in a viewing box and the like opposite the image receptive layer, it is possible to view an image analogous to conventional X-ray images against a blue background. When the resulting recording medium is viewed under room light while utilizing reflected light, it is possible to view the aforesaid image against a white background.

The ink receptive layer in the present invention is not particularly limited, as long as it can absorb ink droplets ejected from ink nozzles. Ink receptive layers include a swellable type ink receptive layer comprised mainly of swellable polymers such as gelatin and PVA, a porous type ink receptive layer in which a structure having pores is formed, and combinations thereof, which is not particularly limited as long as it absorbs ink. However, of these, the porous type ink receptive layer is preferably employed.

In some porous type ink receptive layers, pores are formed by utilizing fine inorganic or organic particles and water-soluble polymers. In order to enhance transparency of the ink receptive layer, preferred as fine inorganic particles are those having a low refractive index, which include, for example, fine particle silica, colloidal silica, calcium silicate, calcium carbonate, and boehmite aluminum hydroxide or hydrates thereof. Of these, silica is preferred.

Fine particle silica is divided mainly into two types based on the preparation method, i.e., a dry process method type and a wet process method type. The aforesaid dry process method, as described herein, refers to a vapor phase method. Known as methods to synthesize fine particle silica employing the vapor phase method are a method (a flame hydrolysis method) in which silicon halide undergoes vapor phase hydrolysis at relatively high temperature, and a method (an arc method) in which borax and coke are heated, reduced, and vaporized in an electric furnace employing an electric arc, followed by aerial oxidation. Alternatively the wet process method silica is prepared as follows: Active silica is formed through acid decomposition of silicates, and subsequently is suitably polymerized to result in aggregation and precipitation. Of fine particle silica, fine particle silica synthesized by the vapor phase method is particularly preferred because a higher porosity as well as higher layer strength can be achieved.

The average diameter of fine inorganic particles is preferably at most 100 nm. In the case of fine particle silica synthesized by the vapor phase method, the average primary particle diameter is preferably at most 30 nm, and is more preferably at most 20 nm. The lower limit is customarily 3 nm due to synthesis. Fine particle silica synthesized by the vapor phase method is subjected to secondary aggregation in the liquid coating composition resulting in formation of larger particles. In such cases, the lower limit of the average diameter of the secondary aggregated particles is preferably 30 nm, while the upper limit is preferably 100 nm.

In the foregoing, the average diameter of fine inorganic particles is determined as described below. Particles themselves or the cross-section or the surface of a porous type ink receptive layer is observed employing an electron microscope. The diameter of 100 randomly selected particles is determined and a simple average (being a number average) of the resulting values is obtained. The diameter of each of the particles, as described herein, refers to the diameter of a circle having the same area as the projection area of each particle.

Listed as examples of usable hydrophilic binders may be polyvinyl alcohols and derivatives thereof, polyalkylene oxides, polyvinylpyrrolidone, polyacrylamide, gelatin, hydroxyethyl cellulose, carboxymethyl cellulose, Pullulan, casein, and dextran. From the viewpoint of layer strength immediately after printing, it is preferable to use hydrophilic binders which exhibit low swellability and low solubility in high-boiling point organic solvents incorporated in ink and water. When polyvinyl alcohols or derivatives thereof are employed, the average degree of polymerization is preferably at least 1,000, and is more preferably at least 2,000. The saponification ratio thereof is preferably 70–100 percent, and is more preferably 80–100 percent. Hydrophilic binders may be employed in combinations of at least two types.

Listed as aforesaid derivatives of polyvinyl alcohol is cation-modified polyvinyl alcohol, anion-modified polyvinyl alcohol, or nonion-modified polyvinyl alcohol.

The cation-modified polyvinyl alcohol is prepared by saponifying a copolymer of an ethylenic unsaturated monomer having a cationic group, and vinyl acetate. Listed as ethylenic unsaturated monomers having a cationic group are, for example, trimethyl-(2-acrylamido-2,2-dimethylethyl)ammonium chloride, trimethyl-(3-acrylamido-3,3-dimethylpropyl)ammonium chloride, N-vinylimidazole, N-vinyl-2-methylimidazole, N-(3-dimethylaminopropyl)methacrylamide, hydroxylethyltrimethylammonium chloride, trimethyl-(-methacrylamidopropyl)ammonium chloride, and N-(1,1-dimethyl-3-dimethylaminopropyl)acrylamide.

The ratio of the cation modifying group-containing monomer of cation-modified polyvinyl alcohol is 0.1–10.0 mol percent with respect to vinyl acetate, and is preferably 0.2–5.0 mol percent. The degree of polymerization of cation-modified polyvinyl alcohols is customarily 500–4,000, and is preferably 1,000–4,000. The saponification ratio of the vinyl acetate group is customarily 60–100 mol percent, and is preferably 70–99 mol percent. Listed as anion-modified polyvinyl alcohols are, for example, polyvinyl alcohol having an anionic group as described in Japanese Patent Publication Open to Public Inspection No. 1-206088, copolymers of vinyl alcohol and vinyl compounds having a water-solubilizing group, as described in Japanese Patent Publication Open to Public Inspection Nos. 61-237681 and 63-307979, and modified polyvinyl alcohols having a water-solubilizing group, described in Japanese Patent Publication Open to Public Inspection No. 7-285265.

In addition, listed as nonion-modified polyvinyl alcohols are, for example, polyvinyl alcohol derivatives as described in Japanese Patent Publication Open to Public Inspection No. 7-9758 in which a polyalkylene oxide group is added to a part of polyvinyl alcohol, and block polymers of vinyl compounds having a hydrophobic group and vinyl alcohol, described in Japanese Patent Publication Open to Public Inspection No. 8-25795.

Listed as examples of water-soluble resins are polyvinyl alcohol (PVA), cellulose based resins (methyl cellulose (MC), ethyl cellulose (EC), hydroxyethyl cellulose (HEC), and carboxymethyl cellulose (CMC)), chitions and starch which have a hydroxyl group as hydrophilic structure units; polyethylene oxide (PEO), polypropylene oxide (PPO), polyethylene glycol (PEG), and polyvinyl ether as resins having an ether bond; and polyacrylamide (PAAM) and polyvinylpyrrolidone (PVP) as resins having an amide group or an amide bond. In addition, listed may be polyacrylates, maleic acid resins, alginates and gelatins which have a carboxylic group as a dissociating group; polystyrenesulfonates having a sulfonic acid; polyallylamine (PAA) having an amino group, an imino group, a tertiary amine and a quaternary ammonium salt, polyethyleneimine (PEI), epoxydated polyamide (EPAm), polyvinylpyridine and gelatins.

The weight ratio of fine particles to the hydrophilic binders of the porous type ink receptive layer of the ink jet recording medium usable in the present invention is preferably not less than three from the viewpoint of a higher porosity as well as higher layer strength. Based on the same reasons, the weight ratio of fine particles to the hydrophilic binders is more preferably not less than 6. Taking into account the resulting cracking of the layer, the upper limit of the weight ratio of fine particles to the hydrophilic binders is preferably at most about 8.

In order to improve the layer forming properties, the water resistance, and the post-printing layer strength of the ink receptive layer, it is preferable that hardeners capable of cross-linking with the aforesaid binders are incorporated in the porous type ink receptive layer of the ink jet recording medium of the present invention. Listed as such hardeners are organic hardeners having an epoxy group, an ethyleneimine group, and an active vinyl group, as well as inorganic hardeners such as chrome alum, boric acid, and borax. When hydrophilic binders are polyvinyl alcohols, specifically preferred are epoxy based hardeners having at least two epoxy groups in their molecule as well as boric acid and salts thereof, as well as borax. Employed as boric acid other than boric acid itself may be metaboric acid, tetraboric acid, and orthoboric acid. The added amount of the aforesaid hardeners is customarily 1–200 mg per g of the aforesaid binders, and is preferably 1–100 mg.

In order to enhance water resistance of the resulting images and bleeding resistance, cationic polymers may be incorporated in the porous type ink receptive layer of the ink jet recording medium of the present invention. Employed as cationic polymers may be, for example, those having a primary, secondary, or tertiary amino group and a quaternary ammonium salt group. Of these, preferred are cationic polymers, having a quaternary ammonium salt group, which minimize discoloration and degradation of light fastness during storage, and enhance dye fixability.

Further, if desired in addition may be basic latex polymers described in Japanese Patent Application Open to Public Inspection No. 7-36692, polyallylamines described in Japanese Patent Publication No. 4-15744, and Japanese Patent Application Open to Public Inspection Nos. 61-58788 and 62-174184, and weak alkaline metal acid salts described in Japanese Patent Application Open to Public Inspection No. 61-47290.

The aforesaid cationic polymers are prepared in the form of homopolymers of monomers having a quaternary ammonium salt group described below as well copolymers with other monomers. Specific examples of preferably usable monomers having a quaternary ammonium salt group are listed below but are not limited thereto.

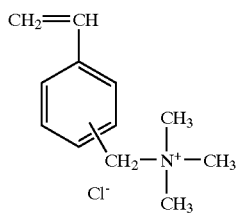

MA-1

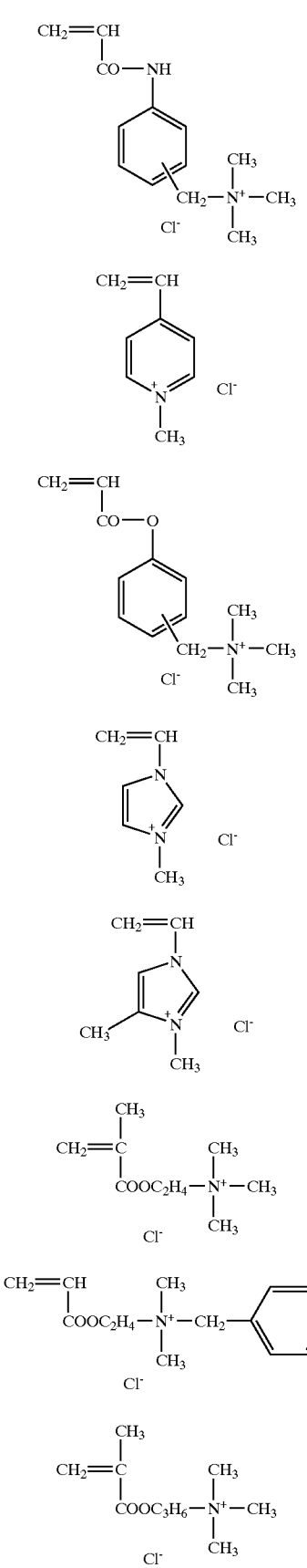
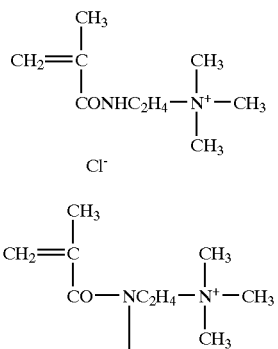
Specific examples of monomers capable of polymerizing with the aforesaid monomers are listed below but are not limited thereto.
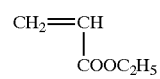
MB-1
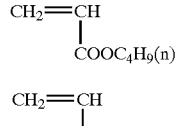
MB-2
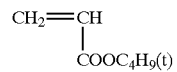
MB-3
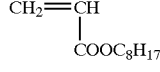
MB-4
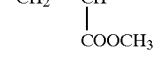
MB-5
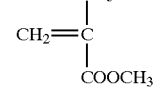
MB-6
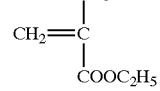
MB-7
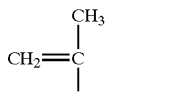
MB-8
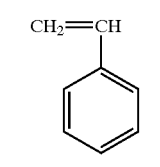
MB-9
MB-10

-continued

MB-11 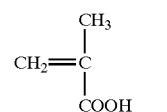

MB-12 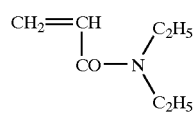

MB-13 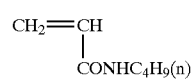

MB-14 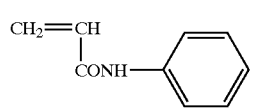

MB-15 

MB-16 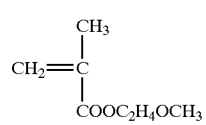

MB-17 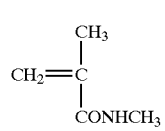

MB-18 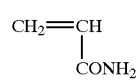

MB-19 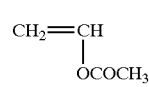

MB-20 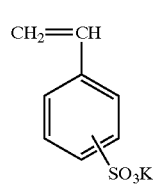

MB-21 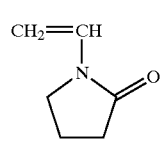

MB-22 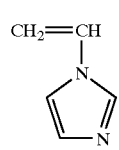

Specific examples of preferably usable cationic polymers, having a quaternary ammonium salt group, are listed below but are not limited thereto. Figures represent mol percentage of monomers.

Mor-1 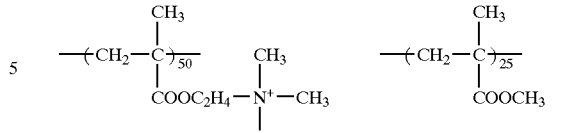 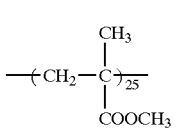

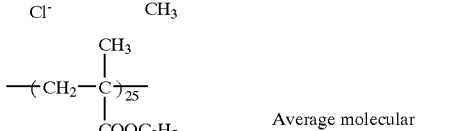

Mor-2

Average molecular weight = about 30,000

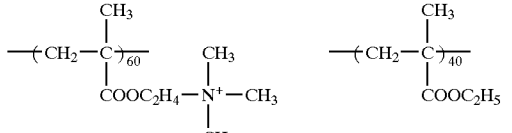 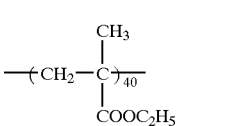

Average molecular weight = about 20,000

Mor-3

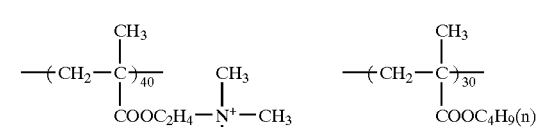 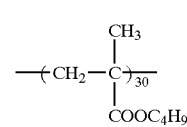

Average molecular weight = about 25,000

Mor-4

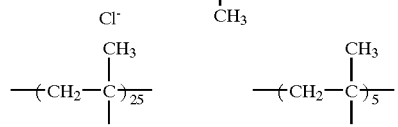 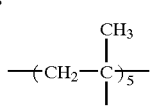

Average molecular weight = about 40,000

Mor-5

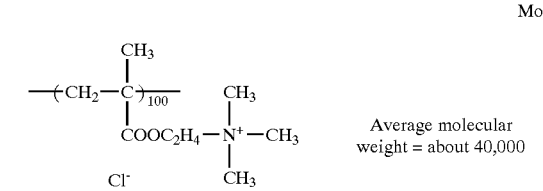

Average molecular weight = about 48,000

Mor-6

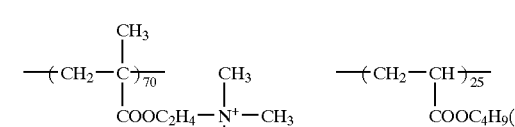 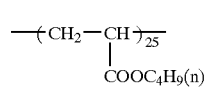

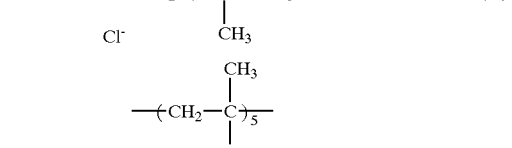

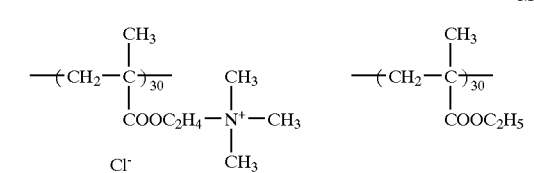 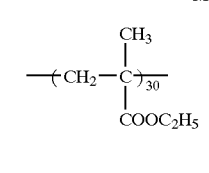

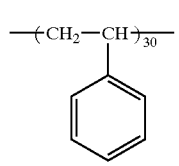 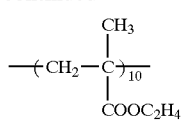

Average molecular weight = about 17,000

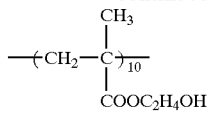

Average molecular weight = about 42,000

Mor-11

Mor-7

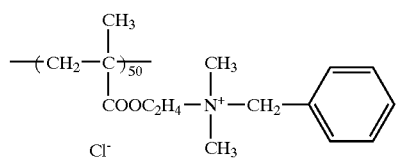 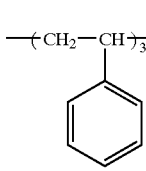

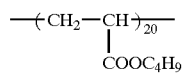

Average molecular weight = about 34,000

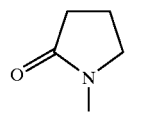

Average molecular weight = about 19,000

Mor-8

Mor-12

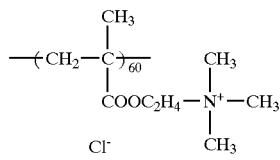 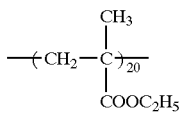

Average molecular weight = about 28,000

 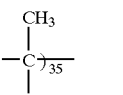

Average molecular weight = about 68,000

Mor-9

Mor-13

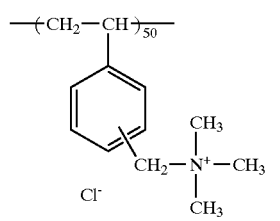 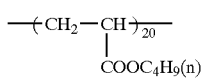

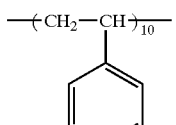

Average molecular weight = about 100,000

Mor-14

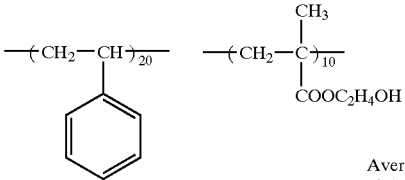

Average molecular weight = about 36,000

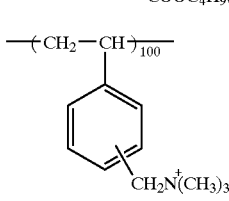

Average molecular weight = about 50,000

Mor-10

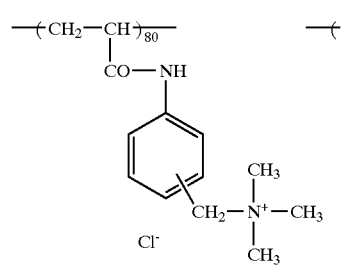

Cationic polymers may be either water-soluble or in the form of latex particles formed by emulsion polymerization. However, it is preferable to use water-soluble cationic polymers. Of water-soluble cationic polymers, a cationic polymer having an average molecular weight of at most 50,000 is preferred because the aforesaid cationic polymer tends not to coagulate with fine inorganic particles nor to suffer degradation of glossiness. The more preferred average molecular weight is at most 30,000. The lower limit of the molecular weight is not particularly specified, but based on the resulting water resistance and moisture resistance, the average molecular weight is at least about 2,000. The average molecular weight, as described herein, means the number average molecular weight which refers to a polystyrene conversion value determined by employing gel permeation chromatography.

The amount of the aforesaid cationic polymers is preferably at least one half the weight with respect to the hydrophilic binders used in the ink receptive layer, making it possible to achieve sufficient water resistance and moisture resistance. Further, the amount of the same is at least two times to achieve the desired layer forming properties of the ink receptive layer. The upper limit of the aforesaid used amount is not specified, but is preferably at most 3 g/m$^2$ from the viewpoint of ink absorbability and curling of recording materials.

If desired, incorporated in an optional layer on the ink receptive layer side may be various types of additives. For example, various types of additives known in the art may be incorporated which include UV absorbers described in Japanese Patent Application Open to Public Inspection Nos. 57-74193, 57-87988, and 62-261476, anti-discoloring agents described in Japanese Patent Application Open to Public Inspection Nos. 57-74192, 57-87989, 60-72785, 61-146591, 1-95091, and 3-13376, various anionic, cationic and nonionic surfactants, optical brightening agents described in Japanese Patent Application Open to Public Inspection Nos. 59-42993, 59-52689, 62-280069, 61-242871, and 4-219266, pH regulators such as sulfuric acid, phosphoric acid, acetic acid, citric acid, sodium hydroxide, potassium hydroxide, and potassium carbonate, lubricants such as diethylene glycol, antiseptic agents, thickeners, antistatic agents, and matting agents.

The ink receptive layer may be provided, for example, on the support as described below. An ink receptive layer forming liquid coating composition is prepared as follows: Fine silicon particles, having an average primary particle diameter of at most 10 nm, are added to water (e.g., 10–15 percent by weight), and the resulting mixture is dispersed for 20 minutes (preferably 10–30 minutes) at a high speed rotation of, for example, 10,000 rpm (preferably 5,000–20,000 rpm), employing a high speed rotation wet type colloid mill (e.g., Clearmix, produced by M Technique Co., Ltd.). Thereafter, an aqueous polyvinyl alcohol solution (for example, in which the weight of PVA is adjusted to approximately ⅓ of the weight of silica) is added and the resulting mixture is dispersed under the same conditions as above. Subsequently the pH is adjusted to 4–5.

The liquid coating composition prepared as above is a homogeneous sol, which is applied onto a support employing the coating method described below, whereby it is possible to prepare an ink receptive layer having a three-dimensional net structure. Namely, by applying the aforesaid liquid coating composition comprised of a homogeneous sol onto a support and subsequently drying the coating, water, used as a solvent, is evaporated. During evaporation, when the coating reaches gelling concentration, a wet gel is formed. During further drying, a porous xerogel is formed, whereby it is possible to prepare the desired ink receptive layer.

It is possible to form the aforesaid ink receptive layer, for example, by applying a liquid coating composition onto the aforesaid support and subsequently heating and drying the resulting coating. Coatings may be carried out employing methods known in the art such as an air doctor coater, a blade coater, a rod bar coater, a knife coater, a squeeze coater, a reverse roll coater, and a bar coater. In order to minimize cracking of the ink receptive layer, especially those having a large thickness, it is preferable that initially drying is carried out at a relatively low temperature (preferably 50–90° C. at an air flow rate of 3–8 m/second), employing a heated air drier and subsequently at a relatively high temperature (preferably 120–180° C., for 5–20 minutes). Further, after coating and drying, it is possible to enhance surface smoothness, transparency, and coating strength by allowing the coating to pass between rollers under applied pressure while heated, employing, for example, a super-calender and a gloss calender. However, since such treatments decrease the porosity (i.e., decrease ink absorbability), these are carried out while setting conditions which minimize a decrease in the porosity.

The porous type ink receptive layer in the present invention is prepared as follows: Materials to form the ink receptive layer are added to suitable solvents such as water, alcohols, or various organic solvents. The resulting mixture is applied onto the aforesaid support and subsequently dried. Viscosity during preparation of the liquid coating composition is critical. It is possible to exhibit sufficient desired effects by regulating preferably to at most 0.1 Pa·s and more preferably to 0.05 Pa·s.

The temperature of the liquid coating composition when applied onto the ink jet recording medium of the present invention, is commonly 25–60° C., and is preferably 30–50° C. After applying the aforesaid liquid coating composition onto the support, it is preferable that the resulting coating is temporarily cooled so that the viscosity of the liquid coating composition increases, or the liquid coating composition is gelled and subsequently dried employing warm air.

It is preferable that layer surface temperature after coating is adjusted to at most 20° C. and preferably to 5–15° C. In order to achieve a uniform layer surface, it is preferable that drying after cooling is commonly carried out by 20–60° C. air flow. Wet layer thickness during coating varies depending on the intended dried layer thickness, but is commonly 50–300 μm, and is preferably 70–250 μm. The coating rate markedly depends on drying capacity but commonly 20–200 m/minute, while drying time is commonly is 2–10 minutes.

Applying the aforesaid ink receptive layer onto the support may be carried out employing a method which is suitably selected from methods known in the art. Coating methods include a roll coating method, a rod bar coating method, an air knife coating method, a spray coating method, and an extrusion coating method described in U.S. Pat. No. 2,681,294, which is preferably employed.

In the ink jet recording medium of the present invention, the amount of coating solids on the ink receptive layer side is preferably 5–40 g/m$^2$, and is more preferably 10–30 g/m$^2$.

The dried layer thickness of the porous type ink receptive layer in the ink jet recording medium of the present invention is determined depending on the layer porosity and the desired void volume, but is commonly at least 15 μm, and is preferably at least 20 μm.

The void volume of the porous type ink receptive layer in the ink jet recording medium of the present invention is preferably 10–40 ml per m$^2$ of the recording material, and is more preferably adjusted to the range of 15–30 ml.

The aforesaid void volume is expressed by the liquid transfer amount (ml/m$^2$) during two-second absorption time when the ink absorbability of a recording material is measured employing the method described in J. TAPPI Pulp and Paper Test Method No. 51–87 Paper and Paper Board Liquid Absorbability Test Method (Bristow's Method). Incidentally, liquid which is used in this case is pure water (ion-exchange water). However, in order to make the discrimination of the measurement area easier, water-soluble dyes may be contained in an amount of less than two percent.

The ink jet recording medium of the present invention may be provided with at least two recording layers comprised of the aforesaid porous type ink receptive layer. In such a case, the ratio of fine inorganic particles to hydrophilic binders of at least two ink receptive layers may be different from each other. Further, the aforesaid ink jet recording medium may comprise no other ink receptive layer than the aforesaid porous type ink receptive layer or may comprise an ink swellable type ink receptive layer together with the aforesaid porous type ink receptive layer. Such swellable type ink receptive layer may be provided as the lower layer (on the side near the support) of the porous type ink receptive layer, as the upper layer (on the side apart from the support) of the porous type ink receptive layer, or as an interlayer between the porous type ink receptive layers when at least two layers are provided. In such swellable type ink receptive layers, hydrophilic binders are commonly employed. Listed as examples of hydrophilic binders employed herein are those which are employed in the aforesaid porous type ink receptive layer.

In order to minimize curling as well as adhesion and ink transfer when stacked on previous prints, it is preferable that the support of the ink jet recording medium of the present invention is provided with various types of backing layers on the side opposite the ink receptive layer. The constitution of the aforesaid backing layers differs depending on the type and thickness of the support as well as the constitution and thickness of the ink receptive layer, but hydrophilic and hydrophobic binders are commonly employed. The thickness of the backing layer is commonly in the range of 0.1–10 $\mu$m. Further, in order to minimize adhesion to other recording materials, and to improve writability as well as transport properties in the ink jet recording apparatus, the surface may be roughened. For this purpose, fine inorganic particles having a diameter of 2–20 $\mu$m are preferably employed.

Aqueous ink employed along with the ink jet recording medium of the present invention will now be described.

The aforesaid aqueous ink is a liquid recording composition comprised of water-soluble dyes, pigments, liquid media, and other additives. Usable water-soluble dyes include direct dyes, acid dyes, base dyes, reactive dyes, and food dyes which are known in the ink jet art. Of these, preferred are either direct dyes or acid dyes.

The solvent of aqueous ink is mainly comprised of water. However, in order to minimize clogging at the leading edge of nozzles and in the ink supply channel due to dye deposits formed by evaporation of ink solvents, high-boiling point organic solvents having a boiling point of at least 120° C. are commonly employed. The aforesaid high-boiling point organic solvents minimize formation of coarse deposits. Such coarse deposits are formed when water is evaporated and solid components such as dyes are deposited. Accordingly, aforesaid high-boiling point organic solvents are required to have much lower vapor pressure than water, while high compatibility with water is also required.

To achieve such purposes, commonly employed as high-boiling organic solvents are many organic solvents having a high boiling point. Listed as specific examples are alcohols such as ethylene glycol, propylene glycol, diethylene glycol, triethylene glycol, glycerin, diethylene glycol monomethyl ether, diethylene glycol monobutyl ether, triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, and polyethylene glycol (having at most an average molecular weight of 300). Other than those described above, also employed may be dimethylformamide and N-methylpyrrolidone.

Of these of many high-boiling point organic solvents, preferred are polyhydric alcohols such as diethylene glycol, triethanolamine, glycerin, and triethanolamine, as well as polyhydric alcohol lower alkyl ethers such as triethylene glycol monobutyl ether.

Listed as other additives incorporated in aqueous ink are, for example, pH regulators, metal sequestering agents, mildewcides, viscosity regulating agents, surface tension regulating agents, humectants, surfactants, and rust inhibitors.

In order to enhance wettability of an aqueous ink composition against recording media as well as to stabilize ejection from ink jet nozzles, the surface tension of the aforesaid aqueous ink composition is customarily in the range of $2.5 \times 10^{-2}$–$4.0 \times 10^{-2}$ Nm$^{-1}$, and is preferably in the range of $2.5 \times 10^{-3}$–$5 \times 10^{-3}$. The pH of the aqueous ink is commonly in the range of 4–10.

The minimum ink droplet volume ejected from the ink nozzle is preferably 1–30 pl because it is possible to obtain minimum dots having a diameter of about 20 to about 60 $\mu$m on the recording materials. Color prints produced by using such a dot diameter result in high quality images. It is preferable that droplets having a minimum volume of 2–20 pl are ejected.

In a recording system in which the aforesaid aqueous ink consists of at least magenta ink and cyan ink, each of which is comprised of at least two inks in which the ink concentration differs at least two times, if not, it becomes difficult to identify dots in the highlight portion due to the use of low concentrations of ink. However, it is possible to apply the present invention to such a case.

In ink jet recording methods, employed as recording methods may be various types of conventional systems known in the art. Details are described, for example, in "Ink Jet Kiroku Gijutsu no Doko (Trends of Ink Jet Recording Technology)", (edited by Koichi Nakamura, Mar. 31, 1995, published by Nihon Kagaku Joho Co., Ltd.).

EXAMPLES

The present invention will now be detailed with reference to examples. However, the embodiments of the present invention are not limited thereto.

Example 1

Preparation of Present Invention Sample 1
(Preparation of Support)

A 180 $\mu$m thick biaxially oriented thermally fixed blue tinted polyethylene terephthalate film (used for silver salt X-ray film) was laminated with a 100 $\mu$m thick white polyester film comprising titanium oxide.

Provided on the blue tinted polyethylene terephthalate film side was a sublayer comprised of, as main components, a water-soluble polymer comprising sodium styrenesulfonate as a copolymerization component, and styrene-acryl-glycidyl acrylate copolymer latex.

Further, applied onto the aforesaid sublayer was the backing layer liquid coating composition described below to result in a dried layer thickness of 2.5 μm.
(Backing Layer Liquid Coating Composition)

| | |
|---|---|
| Gelatin | 70 g |
| Silica based matting agent (having an average particle diameter of 3.0 μm) | 1 g |
| (C-1) | 21 g |
| Hardener (A-1) | 0.5 g |

The above components were mixed and the volume of the resulting mixture was adjusted to 1 liter by adding pure water.

(Measurement of Whiteness)

Whiteness of the white substrate of the resulting support was measured as follows:

Spectral reflectance of the white substrate side of the support was measured in the range of 380–780 nm, employing a Color Analyzer Type 607 (produced by Hitachi, Ltd.). Subsequently tristimulus values were obtained based on JIS Z 8722 (2000). Further L* was calculated according to the CIE color system method, and was designated as whiteness. The whiteness of the white substrate of the aforesaid support was 95.

(Measurement of Transmittance)

Further, transmittance of the resulting support was measured as follows:

Transmittance in the range of 400–700 nm was measured employing a Spectrophotometer Type U-3200 (produced by Hitachi, Ltd.) and the average of transmittance at each wavelength was obtained. The transmittance of the aforesaid support was 70.

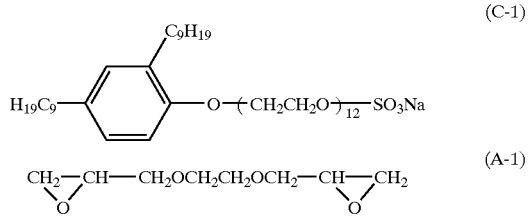

The ink receptive layer liquid coating composition described below was applied onto the support prepared as above to result in a dried layer thickness of 45 μm.

<<Preparation of Ink Receptive Layer Liquid Coating Composition>>

All weight part values showing the composition amounts of the liquid coating composition represent total solids or nonvolatile materials.

| | |
|---|---|
| Dry Process Fine Silica Particles (Aerosil A300 having an average primary particle diameter of 7 nm, a refractive index of 1.45, a surface silanol group of 2–3/nm²; produced by Nippon Aerosil Co., Ltd.) | 10.0 weight parts |
| Polyvinyl alcohol (PVA235 having a saponification ratio of 88 percent and a degree of polymerization of 3,500; produced by Kuraray Co., Ltd.) | 3.3 weight parts |
| Ion-exchange water | 136.0 weight parts |

Dry process fine silica particles were added to ion-exchange water (73.3 weight parts) and the resulting mixture was dispersed at 10,000 rpm for 20 minutes, employing a high speed rotation wet type colloid mill (Clearmix, produced by M Technique Co., Ltd.). Thereafter, added was an aqueous polyvinyl alcohol solution (prepared by dissolving polyvinyl alcohol in 62.7 weight parts of the remaining ion-exchange water) was and the resulting mixture dispersed under the same conditions as above. Subsequently the pH of the resulting dispersion was adjusted to 4–5, whereby an ink receptive layer liquid coating composition was prepared.

Preparation of Present Invention Sample 2

(Preparation of Support)

A 180 μm thick biaxially oriented thermally fixed blue tinted polyethylene terephthalate film (used for silver salt X-ray film) was laminated with a 70 μm thick plain paper sheet.

On the blue tinted polyethylene terephthalate film side provided was a sublayer comprising as main components a water-soluble polymer comprising sodium styrenesulfonate as a copolymerization component and styrene-acryl-glycidyl acrylate copolymer latex.

Further, applied onto the aforesaid sublayer was the backing layer liquid coating composition employed in Present Invention Sample 1 to result in a dried layer thickness of 2.5 μm.

Whiteness of the white substrate of the resulting support was 90 and transmittance of the support was 65%.

The same ink receptive layer liquid coating composition as Present Invention Sample 1 was applied onto the support prepared as above to result in a dried layer thickness of 45 μm.

Preparation of Comparative Sample

A 180 μm thick biaxially oriented thermally fixed blue tinted polyethylene terephthalate film was used without any modification. Sublayers were then provided on both sides in the same manner as Sample 2 and the same backing layer as Present Invention Sample 1 was provided on one side.

The resulting support had no a white substrate. Whiteness of one side of the support was 20, and transmittance of the support was 95.

The same ink receptive layer liquid coating composition as Present Invention Sample 1 was applied onto the support prepared as above to result in a dried layer thickness of 45 μm.

(Output of Medical Diagnostic Images)

A human chest X-ray image was outputted onto each of the resulting samples, employing an ink jet printer.

(Observation of Medical Diagnostic Images)

1. Observation on a Viewing Box

The backing layer side of each of Present Invention Samples 1 and 2, and Comparative Sample were placed in contact with a viewing box and images were observed utilizing transmitted light. It was easy to observe the image of each of the samples. In addition, the color of the background was blue, being what medical staff are accustomed to viewing.

2. Observation Under Ambient Room Light

The light source in the viewing box was turned off. Subsequently each image was observed under ambient room light. It was possible to easily observe the image of each of Present Invention Sample in the same manner as the observation using the viewing box. However, it was difficult to observe the image of the Comparative Sample.

Effects of the Invention

In accordance with the present invention, it is possible to provide an ink jet recording medium which makes it possible to observe an image recorded by an ink jet system or to use the aforesaid image for practical medical diagnosis, utilizing either reflected light or transmitted light.

What is claimed is:

1. An ink-jet recording medium comprising a support having thereon an ink receptive layer,
    wherein the support comprises a white-colored substrate and a blue-colored substrate laminated with each other, and
    wherein the blue-colored substrate has a transmittance of 0.05 to 0.4 or has a maximum absorption wavelength within a range of 520 nm to 580 nm.

2. The ink-jet recording medium of claim 1, wherein the white substrate is a white-colored synthetic paper.

3. The ink-jet recording medium of claim 2, wherein the white-colored synthetic paper is a polymer film containing a white pigment.

4. The ink-jet recording medium of claim 3, wherein the polymer film is a polyethylene terephthalate film.

5. The ink-jet recording medium of claim 3, wherein the white pigment is titanium dioxide or magnesium carbonate.

6. The ink-jet recording medium of claim 1, wherein the white-colored substrate has a whiteness degree of 50 to 100.

7. The ink-jet recording medium of claim 1, wherein the blue-colored substrate is a blue-colored polymer film.

8. The ink-jet recording medium of claim 7, wherein the blue-colored polymer film is a blue-colored polyester film.

9. The ink-jet recording medium of claim 7, wherein the blue-colored polymer film is a polymer film colored with a dye having a maximum absorption wavelength within a range of 520 nm to 580 nm.

10. The ink-jet recording medium of claim 7, wherein the blue-colored polymer film is a polymer film colored with a dye selected from the group consisting of an anthraquinone dye, an azo dye, an azomethine dye, an oxonol dye, a carboxycyanine dye and a styryl dye.

11. The ink-jet recording medium of claim 10, wherein the blue-colored polymer film contains the dye in an amount of 20 to 5000 ppm of the polymer amount.

12. The ink-jet recording medium of claim 1, wherein the ink receptive layer is a porous-type ink receptive layer.

13. The ink-jet recording medium of claim 1, wherein the white-colored substrate is a polyethylene terephthalate film containing a white pigment, and the blue-colored substrate is a blue-colored polyester film.

14. The ink-jet recording medium of claim 1, wherein the support has a transmittance of not less than 30.

15. The ink-jet recording medium of claim 1, wherein the white-colored substrate and the blue-colored substrate is pasted by an adhesive agent.

16. The ink-jet recording medium of claim 1, wherein the support comprises each of the white-colored substrate and the blue-colored substrate, singly, and comprises no other substrate than the white-colored substrate and the blue-colored substrate.

17. The ink-jet recording medium of claim 1, wherein the ink receptive layer is provided on a side of the white-colored substrate of the support.

18. The ink-jet recording medium of claim 17, wherein at least a subbing layer between the ink receptive layer and the support.

19. The ink-jet recording medium of claim 1, wherein the blue-colored substrate has a transmittance of 0.05 to 0.4 and has a maximum absorption wavelength within a range of 520 nm to 580 nm.

* * * * *